United States Patent [19]

Boyce et al.

[11] Patent Number: 4,808,461
[45] Date of Patent: Feb. 28, 1989

[54] COMPOSITE STRUCTURE REINFORCEMENT

[75] Inventors: Joseph S. Boyce, Hanover; Roland R. Wallis, Jr., Allston; Daniel E. Bullock, Pittsfield, all of Mass.

[73] Assignee: Foster-Miller, Inc., Waltham, Mass.

[21] Appl. No.: 132,347

[22] Filed: Dec. 14, 1987

[51] Int. Cl.[4] .............................. B32B 3/26; B32B 7/04
[52] U.S. Cl. ..................................... 428/119; 156/285; 156/287; 428/317.9; 428/319.1
[58] Field of Search ............ 428/119, 234; 300, 317.9, 428/319.1; 156/285, 287

[56] References Cited

U.S. PATENT DOCUMENTS

| | | | |
|---|---|---|---|
| 4,136,226 | 1/1979 | Gilman | 428/119 |
| 4,177,306 | 12/1979 | Schulz et al. | 428/119 |
| 4,274,901 | 6/1981 | Elber | 156/242 |
| 4,361,613 | 11/1982 | Bogner et al. | 428/119 |
| 4,469,740 | 9/1984 | Bailly | 428/234 |
| 4,637,947 | 1/1987 | Maekawa et al. | 428/300 |

OTHER PUBLICATIONS

Kim, et al., "Initiation of Delamination of Composite Laminates", *Proceedings of U.S.-Japan Joint Conference on Exp. Analysis*, SESA, Hawaii, May, 1982, pp. 244–251.

Kim, et al., "Experimental and Analytical Studies on the Onset of Delamination in Laminated Composites", *Journal of Composite Materials*, vol. 18, Jan., 1984, pp. 70–80.

Sawyer, "Effect of Stitching on the Strength of Bonded Composite Single Lap Joints", *AIAA Journal*, vol. 23, No. 11, pp. 1744–1748.

*Primary Examiner*—William J. Van Balen

[57] ABSTRACT

Translaminar reinforcement structure for localized Z-direction reinforcement of composite structure includes a body of thermally decomposable material that has substantially opposed surface, a plurality of reinforcing elements in the body that extend generally perpendicularly to one body surface, and pressure intensifying structure on the other opposed body surfaces for applying driving force to the reinforcing elements for insertion into the composite structure as the body is subjected to elevated temperature and decomposes.

22 Claims, 2 Drawing Sheets

STEP 1

STEP 2

STEP 3

STEP 4

COMPOSITE STRUCTURE REINFORCEMENT

This invention was made with Government support under Navy Contract N60530-87-C-0024. The Government has certain rights in this invention.

This invention relates to composite structures, and more particularly to the enhancement of the strength and damage tolerance of composite structures.

Composite structures offer a variety of properties not available in metal counterparts, and are extensively utilized in aerospace, automotive, marine and other applications. Most standard composite fabrication techniques result in a laminate structure of individual layers or plies consisting of fiber reinforcement in a resin matrix, the matrix resin being relatively weak without the reinforcement. Interlaminar properties of such a laminate structure are weak in comparison with in-plane properties of the composite. For example, the weak interply region is an area for easy crack propagation. Cracks can be caused by thermal effects, impact events or the presence of holes or edges. Structural failure can often be traced to interply cracking. Impact damaged panels will often fail catastrophically when subject to compression or flexural loading. Also, the presence of such cracks severely reduces the compressive strength of the laminate and can lead to early delamination and failure.

A number of methods for improving the strength of such composite structures have been investigated and include the use of stitching, stapling and needling. Such techniques tend to damage the main reinforcements and cause a reduction of in plane properties. Also, the uncured laminate must be removed from the layup tool and passed through the stitching or needling machine. This operation can cause further damage, particularly if the laminate is large or of complicated shape.

In accordance with one aspect of the invention, there is provided translaminar reinforcement structure that permits localized Z-direction reinforcement of critical areas of a completed layup, either to the composite structure alone or in conjunction with stiffening stringer structures or the like. The reinforcement structure includes a body of thermally decomposable material that has substantially opposed surfaces, a plurality of reinforcing elements in the body that extend generally perpendicularly to one body surface, and pressure intensifying structure on the other opposed body surface for applying driving force to the reinforcing elements for insertion into the composite structure as the body is subjected to elevated temperature and decomposes.

Preferably, the volume of the reinforcing elements in the thermally decomposable material is in the range of 0.5-5 percent, the reinforcing elements are fiber-like and have cross-sectional dimensions in the range of 0.05-0.5 millimeter and each reinforcing element has a length that is at least ten times its cross sectional dimension. Also, it is preferred that the reinforcing elements be of generally uniform cross sectional configuration along their length, and extend substantially the entire distance through the body of thermally decomposable material between its opposed surfaces.

In particular embodiments, the thermally decomposable material is a foam-like material that is stable and has substantial stiffness at room temperature and preferably is selected from the class consisting of polyvinylchlorides, polyesters, polyethylenes, polypropylenes, polyurethanes, polystyrenes, cellulose acetates, polyimides, silicones and polybenzimidazoles. The material of the reinforcing elements preferably has sufficient rigidity to penetrate the composite structure without buckling and may be of an elemental material such as aluminum, boron, graphite, titanium, or tungsten; a ceramic such as silicon carbide, aluminum oxide or aluminum nitride; a rigid polymer such as a phenolic, a polyimide or an epoxy; or an alloy or composite of such materials, particularly preferred materials including boron and silicon carbide.

In use, one or more reinforcement structures are applied to desired locations on an uncured composite to be reinforced and the composite with applied reinforcement structures is subjected to temperature and pressure cycling, for example in an autoclave. Pressure and elevated temperature are applied to the composite and reinforcement structure as the composite is being cured, the thermally decomposable body material decomposes or collapses, and the reinforcing elements are driven into the composite by pressure acting on the pressure intensifying structure. After curing, the reinforcement structure residue is removed and projecting ends, if any, of reinforcing elements are round or otherwise finished flush with the surface of the composite. Preferably, there is a correlation between the collapse or decomposition temperature of the thermally decomposable material and the minimum viscosity temperature of the prepreg matrix resin.

In a preferred process, the composite structure includes an array of reinforcing fibers in a matrix resin selected from epoxies, polyimides, bismaleimides, phenolics, polycyanurates, polyesters and vinylesters; the reinforcement structure is applied to a surface of the composite, and the reinforcing structure and the composite structure are subjected to a processing cycle of elevated temperature and pressure. Particulars of the processing cycle are a function of the type of matrix resin. A typical processing cycle includes a ramped or stepped temperature increase to 200°-400° F. followed by a hold interval sufficient to cause degregation of the foam body material, during which sequence the reinforcing elements are inserted into the composite. The elevated temperature may be then sustained or further increased for a period sufficient to cause curing of the matrix resin. Supplemental pressure may be applied throughout or selectively for various periods during the processing cycle to consolidate the composite laminate and enhance penetration action of the reinforcing elements via the pressure intensifying structure. A particular processing sequence includes application of vacuum and external pressure to the composite - reinforcement structure assembly, with an initial temperature increase interval at a rate of at least 1° F. per minute, a first hold interval of at least ten minutes at a temperature of at least about 200° F., a subsequent second temperature increase interval at a rate of at least 1° F. per minute, and a subsequent second hold interval of at least thirty minutes at a temperature of at least about 300° F. such that after the reinforcing elements are inserted into the composite structure, the matrix resin cure is continued. The reinforced composite is then cooled, the residue of the collapsed thermally decomposable material is removed from the composite structure and projecting end portions, if any, of the reinforcing elements are removed, as by grinding, to provide a smooth surface of the cured composite.

Other features and advantages will be seen as the following description of particular embodiments progresses, in conjunction with the drawings, in which.

DESCRIPTION OF PARTICULAR EMBODIMENTS

Figure 1:
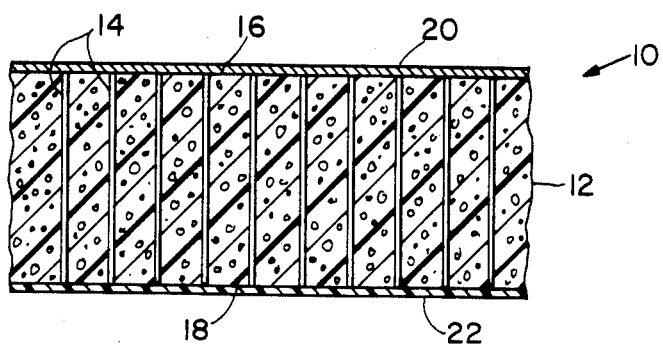
FIG. 1 is a sectional view of a portion of reinforcing structure in accordance with the invention.

The reinforcing structure 10 shown in FIG. 1 includes body 12 of polyvinyl foam material (Divinycell HT110) that has density of about seven pounds per cubic foot and a thickness of about eight millimeters. For increased flexibility, body 12 may be skived into multiple adjacent blocks. An array of boron filaments 14 (each about 0.1 millimeter in diameter and eight millimeter long) are disposed in body 12 and extend generally perpendicular to planar surface 16. X and Y spacings between fibers 14 are about 1.5 millimeters. On body surface 16 is pressure intensifying stainless steel sheet 20 of about 0.1 millimeter thickness and, PTFE release sheet 22 is disposed on opposed surface 18.

Figure 2:
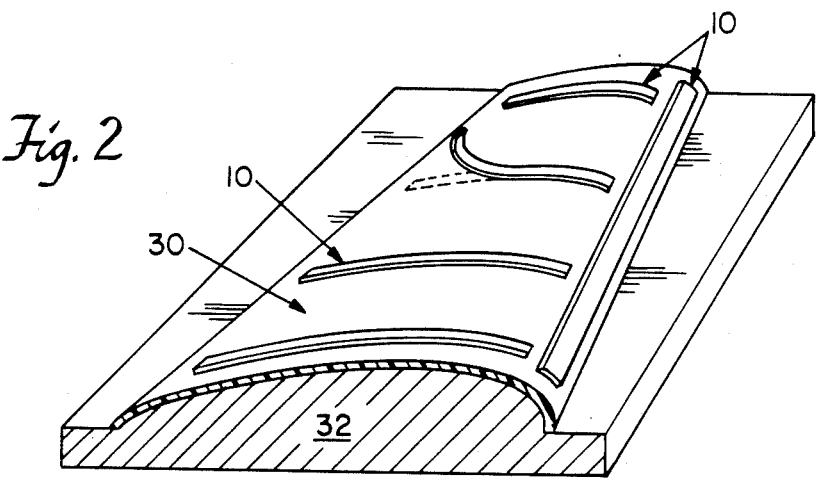
FIG. 2 illustrates placement of reinforcement tape structures on a layup to be reinforced.

Reinforcing structures 10 in the form of elongated tape like members are positioned at desired locations on graphite-epoxy prepreg composite layup 30 that is disposed on supporting tool 32 as indicated in FIG. 2. Prepreg 30, (epoxy AS4/3501-6) has a processing cycle of the type indicated in FIG. 3.

Figure 3:
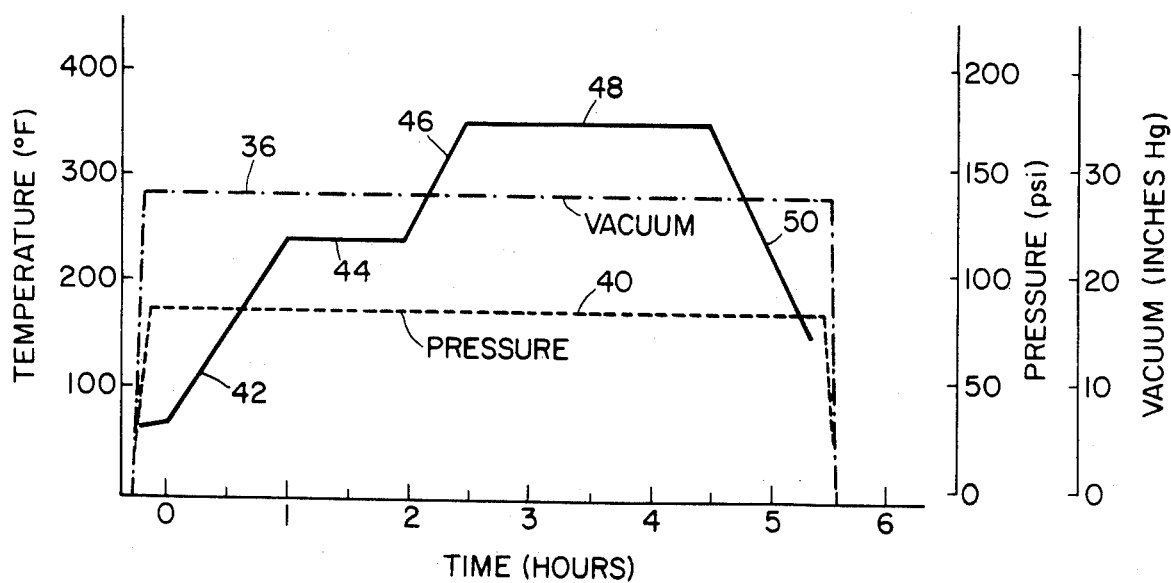
FIG. 3 is a time-temperature diagram of a processing sequence.
Figure 4:
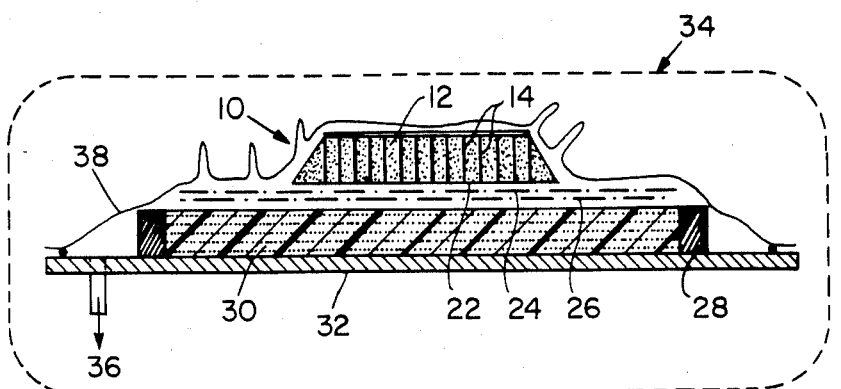
FIGS. 4-7 are a series of diagrams indicating a processing sequence.
Figure 5:
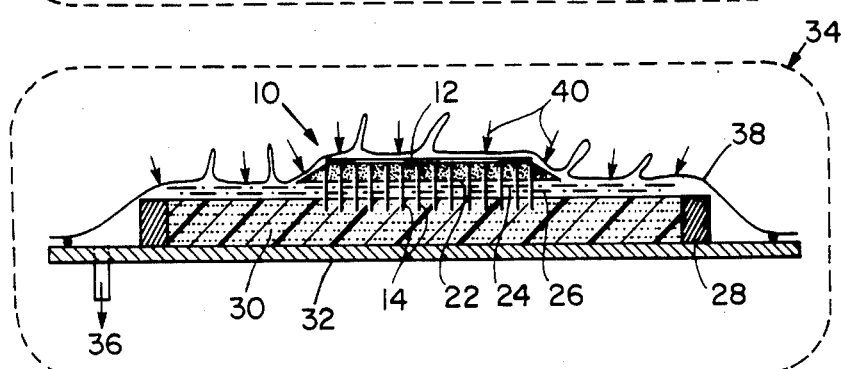
Figure 6:
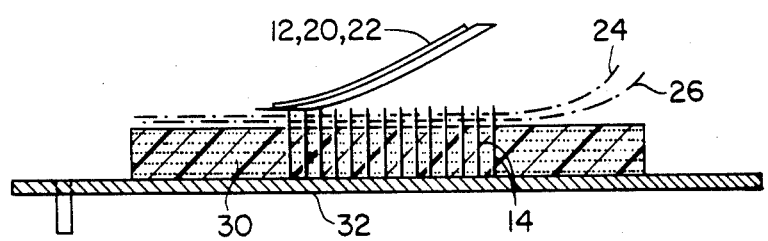
Figure 7:
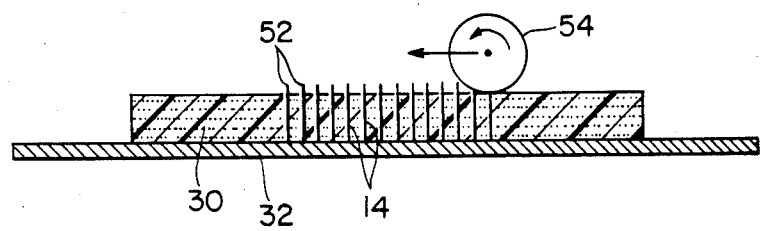

Pregreg 30 with reinforcing structures 10 is assembled on support tool 32 as diagrammatically indicated in FIG. 4 with connection to vacuum 36, film bag 38 enclosing release sheet 26, bleeder cloth 24 and cork dam 28, as well as prepreg 30 with reinforcing structures 10 and support tool 30, and is placed in autoclave 34. In the processing sequence, as indicated in FIG. 3, bag 38 is initially evacuated by vacuum 36 to a pressure of twenty-five inches of mercury, and then an external pressure as indicated by arrows 40 of eighty-five pounds per square inch is applied. The autoclave temperature is ramped up at a rate of 3-5 degrees per minute, as indicated at 42 in FIG. 3, to raise the temperature to 240° F. while holding the autoclave pressure at 85 pounds and the bag vacuum at about 25 inches of mercury. The temperature, pressure and vacuum are held for about one hour (interval 44). As the epoxy matrix material approaches its minimum viscosity, the vinyl body 12 begins to decompose and the autoclave pressure acting on pressure intensifying sheet 20, forces the boron fibers 14 through release plies 22, 26 and bleeder cloth 24 and into laminate 30 in the Z-direction (perpendicular to surface 16) as indicated in FIG. 5. Continued application of pressure drives the fibers 14 through the laminate 30 to impinge on support tool 32. After hold interval 44, the autoclave temperature is again raised at a rate of 3-5 degrees per minute to 350° F. as indicated at 46) and held at the temperature and pressure for a cure interval 48 for about two hours for curing the epoxy laminate. The temperature of the autoclave is then lowered at a rate of about five degrees per minute (as indicated at 50) to reduce the laminate temperature to 200° F. Autoclave pressure and vacuum are released and the cured reinforced composite is removed from the autoclave and unbagged as indicated in FIG. 6. After removal of plastics residue 12 and plys 20, 22, 24 and 26 from the cured laminate 30, the exposed ends 52 of reinforcing elements 14 are round flush with abrasive wheel 54, as indicated in FIG. 7.

Double cantilever beam tests show the reinforcement fibers 14 provide a significant increase in critical strain energy release rate. Scanning electromicrographs of reinforced specimens show that the penetration by the boron fibers 14 does not damage the laminate fibers. No significant reduction in in-plane tensile strength and interlaminar shear strength between reinforced and unreinforced laminates was found.

Figure 8:
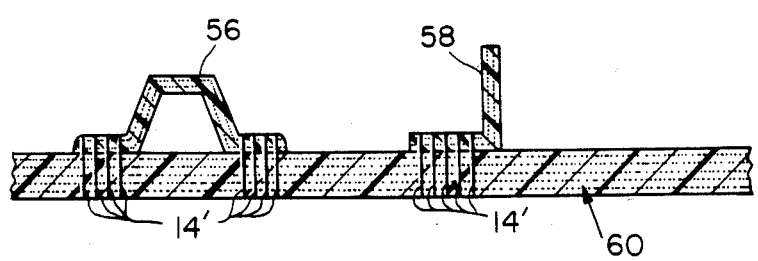
FIG. 8 is a sectional diagrammatic view of another embodiment.

Reinforced sixteen and thirty two ply laminates were subjected to impact and compression testing. The testing results indicate significant enhancement of the composite structures. This Z-direction reinforcement may be used to reinforce critical and crack-prone areas of a structure. In another embodiment illustrated in FIG. 8, the reinforcing fibers 14' are inserted in critical areas and anchor composite stiffening stringers 56 and 58, which are co-cured with the composite laminate 60.

While particular embodiments of the invention has been shown and described, various modifications of the form of reinforcing structures, materials of construction, and processing methods will be apparent to those skilled in the art, and therefore it is not intended that the invention be limited to the disclosed embodiment or to details thereof, and departures may be made therefrom within the spirit and scope of the invention.

What is claimed is:

1. Translaminar reinforcement structure for Z-direction reinforcement of a composite structure comprising
   a body of thermally decomposable material that has opposed surfaces,
   a plurality of reinforcing elements in said body extending generally perpendicularly to one of said opposed surfaces, and
   pressure intensifying structure on the other opposed body surface for applying driving force to said reinforcing elements for insertion into a composite structure as said body of thermally decomposable material is subjected to elevated temperature.

2. The reinforcement structure of claim 1 wherein said thermally decomposable material is a foam-like material which is stable and has substantial stiffness at room temperature, said foam-like material providing sufficient elastic constraint to said reinforcing elements to prevent buckling during insertion into said composite structure.

3. The reinforcement structure of claim 1 wherein said thermally decomposable material is selected from the class consisting of polyvinylchlorides, polyesters, polyethylenes, polyproplenes, polyurethanes, polystyrenes, polyimides, cellulose acetates, silicones and polybenzimidazoles.

4. The reinforcement structure of claim 1 wherein said reinforcing elements have sufficient rigidity to penetrate said composite structure without buckling.

5. The reinforcement structure of claim 1 wherein the material of said reinforcing elements is selected from the class consisting of aluminum, boron, carbon or raphite, titanium, tungsten, glass, silicon carbide, aluminum oxide, aluminum nitride, rigid phenolics, rigid polyimides, rigid epoxies, and composites of such materials.

6. The reinforcement structure of claim 1 wherein the volume of said reinforcing elements in said body of thermally decomposable material is in the range of 0.5-5 percent.

7. The reinforcement structure of claim 1 wherein said pressure intensifying structure is a sheet of about 0.01-0.5 millimeter thickness that is secured on the other of said opposed body surfaces.

8. The reinforcement structure of claim 1 wherein said reinforcing elements have a cross-sectional dimension in the range of 0.05-0.5 millimeter, and each said reinforcing element has a length that is at least ten times its said cross-sectional dimension.

9. The reinforcement structure of claim 8 wherein the volume of said reinforcing elements in said body of thermally decomposable material is in the range of 0.5-5 percent.

10. The reinforcement structure of claim 9 wherein said reinforcing elements have sufficient rigidity to penetrate said composite structure without buckling, and the material of said reinforcing elements is selected from the class consisting of aluminum, boron, carbon, graphite, titanium, tungsten, glass, silicon carbide, aluminum oxide, aluminum nitride, rigid phenolics, rigid polyimides, rigid epoxies, and composites of such materials.

11. The reinforcement structure of claim 10 wherein said pressure intensifying structure is a metal sheet of about 0.01-0.5 millimeter thickness that is secured on the other of said opposed body surfaces.

12. The reinforcement structure of claim 11 wherein said thermally decomposable material is a foam like material which is stable and has substantial stiffness at room temperature, said foam-like material providing sufficient elastic constraint to said reinforcing elements to prevent buckling during insertion into said composite structure, said thermally decomposable material is selected from the class consisting of polyvinylchlorides, polyesters, polyethylenes, polyproplenes, polyurethanes, polystyrenes, polyimides, cellulose acetates, silicones and polybenzimidazoles.

13. The reinforcement structure of claim 12 wherein said reinforcing elements are of substantially uniform cross-sectional configuration along their length, and extend substantially the entire distance through said body of polymeric material between said opposed surfaces.

14. The method of Z-direction reinforcement of a composite structure comprising the steps of
providing a composite structure that includes an array of reinforcing fibers in a resin matrix,
applying reinforcement structure to a surface of said composite, said reinforcement structure including a body of thermally decomposable material that has opposed surfaces, a plurality of reinforcing elements in said body which extend generally perpendicularly to one of said opposed surfaces, and pressure intensifying structure on the other opposed body surface for applying driving force to said reinforcing elements, and
subjecting said reinforcing structure and said composite structure to elevated temperature and pressure to insert said reinforcing elements into said composite structure as said body of thermally decomposable material collapses under the influence of said elevated temperature and pressure.

15. The method of claim 14 wherein the collapse temperature of said thermally decomposable material is correlated with the minimum viscosity temperature of said matrix resin as said matrix resin is curing.

16. The method of claim 14 wherein said reinforcing elements are of generally uniform cross-sectional configuration along their length, and extend substantially the entire distance through said body of thermally decomposable material between said opposed surfaces.

17. The method of claim 14 wherein said thermally decomposable material is selected from the class consisting of polyvinylchlorides, polyesters, polyethylenes, polyproplenes, polyurethanes, polystyrenes, polyimides, cellulose acetates, silicones and polybenzimidazoles; said matrix resin is selected from the class consisting of epoxies, polyimides, bismaleimides, phenolics, polycyanurates, polyesters and vinylesters; and the material of said reinforcing elements is selected from the class consisting of aluminum, boron, carbon or graphite, titanium, tungsten, glass, silicon carbide, aluminum oxide, aluminum nitride, rigid phenolics, rigid polyimides, rigid epoxies; and composites of such materials.

18. The method of claim 17 and further including the steps of removing the residue of the collapsed thermally decomposable material from said composite structure and then removing any projecting end portions of said reinforcing elements to provide a smooth surface of said cured reinforced composite.

19. The method of claim 14 and further including the steps of placing said reinforcing structure and said composite structure in autoclave structure in which said reinforcing structure and said composite structure are subjected to combined pressure and vacuum forces during a thermal cycle that includes an initial temperature increase followed by a hold interval during which said body of thermally decomposable material collapses and said reinforcing elements penetrate said composite structure and a subsequent interval sufficient to cause cure of said matrix resin.

20. The method of claim 19 wherein said initial temperature increase is at a rate of at least 1° F. per minute, said hold interval has a duration of at least ten minutes at a temperature of at least about 200° F., and during said subsequent interval said reinforcing structure and said composite structure are subjected to a second temperature increase interval at a rate of at least 1° F. per minute, and a second hold interval of at least thirty minutes at a temperature of at least about 300° F.

21. The method of claim 19 wherein said reinforcing elements are of generally uniform cross-sectional configuration along their length, and extend substantially the entire distance through said body cf thermally decomposable material between said opposed surfaces, said reinforcing elements have a cross-sectional dimension in the range of 0.05-0.5 millimeter, and each said reinforcing element has a length that is at least ten times its said cross-sectional dimension, the volume of said reinforcing elements in said body of thermally decomposable material is in the range of 0.5-5 percent, the collapse temperature of said thermally decomposable material is correlated with the minimum viscosity temperature of said matrix resin as said matrix resin is curing.

22. The method of claim 21 wherein said thermally decomposable material is selected from the class consisting of polyvinylchlorides, polyesters, polyethylenes, polyproplenes, polyurethanes, polystyrenes, polyimides, cellulose acetates, silicones and polybenzimidazoles; said matrix resin is selected from the class consisting of epoxies, polyimides, bismaleimides, phenolics, polycyanurates, polyesters and vinylesters; and the material of said reinforcing elements is selected from the class consisting of aluminum, boron, carbon or graphite, titanium, tungsten, glass, silicon carbide, aluminum oxide, aluminum nitride, rigid phenolics, rigid polyimides, rigid epoxies; and composites of such materials, and further including the steps of removing the residue of the collapsed thermally decomposable material from said composite structure and then removing any projecting end portions of said reinforcing elements to provide a smooth surface of said cured reinforced composite.

* * * * *